US006239834B1

United States Patent
Miyaji et al.

(10) Patent No.: US 6,239,834 B1
(45) Date of Patent: May 29, 2001

(54) APPARATUS FOR EVALUATING DIGITAL PICTURE QUALITY

(75) Inventors: Satoshi Miyaji, Tokyo; Takahiro Hamada, Saitama; Shuichi Matsumoto, Tokyo, all of (JP)

(73) Assignee: Kokusai Denshin Denwa Co., Ltd., Tokyo (JP)

( * ) Notice: Subject to any disclaimer, the term of this patent is extended or adjusted under 35 U.S.C. 154(b) by 0 days.

(21) Appl. No.: 08/775,876

(22) Filed: Jan. 2, 1997

(30) Foreign Application Priority Data

Jan. 11, 1996 (JP) .................................................. 8-019308
May 10, 1996 (JP) .................................................. 8-139766

(51) Int. Cl.[7] ........................... H04N 17/00; H04N 17/02
(52) U.S. Cl. ........................... 348/193; 348/192; 348/180
(58) Field of Search .................................. 348/193, 192, 348/180, 177; 455/67.3, 67.4; 375/227; H04N 17/00, 17/02

(56) References Cited

U.S. PATENT DOCUMENTS

| | | | |
|---|---|---|---|
| 3,683,282 | * 8/1972 | D'Amato et al. | .................... 348/193 |
| 3,825,835 | * 7/1974 | Hammett et al. | .................... 348/193 |
| 3,995,105 | * 11/1976 | Krivosheev et al. | ................ 348/193 |
| 4,581,639 | * 4/1986 | Judge | .................................... 348/192 |
| 4,628,360 | * 12/1986 | Mook et al. | ........................ 348/193 |
| 5,329,311 | * 7/1994 | Ward et al. | ........................ 348/193 |
| 5,751,766 | * 5/1998 | Kletsky et al. | ...................... 348/193 |

OTHER PUBLICATIONS

"Experimentally Derived Weighting Function in Spatial Frequency Domain for Evaluating Still Pictures", Hangai et al, *Journal of the Japanese Television Society,* vol. 46, No. 3, 1992, pp. 295–299.

"The Marginal Performance of Motion Compensated DCT Coding Scheme Based on Optimized Quantizer", Hamada et al, *Proceedings of Electronics Information and Communication Society,* B–I, vol. J 78 B–I, No. 11, Nov. 1995, pp. 689–699.

* cited by examiner

*Primary Examiner*—Andrew Faile
*Assistant Examiner*—Vivek Srivastava
(74) *Attorney, Agent, or Firm*—Arent Fox Kintner Plotkin & Kahn, PLLC (57) ABSTRACT

An apparatus for evaluating digital picture quality, includes a SNR calculation module for calculating a SNR based upon differences between data of video picture to be evaluated and data of original video picture, a module for calculating a power of AC component of overall data of one of the video pictures in a frame, and a weighting module for weighting the calculated SNR based upon the calculated power of the AC component.

19 Claims, 8 Drawing Sheets

| 0.5 | 0.5 | 0.5 | 0.5 | 0.5 | 0.5 | 0.5 |
|-----|-----|-----|-----|-----|-----|-----|
| 0.5 | 0.6 | 0.6 | 0.6 | 0.6 | 0.6 | 0.5 |
| 0.5 | 0.6 | 0.7 | 0.7 | 0.7 | 0.6 | 0.5 |
| 0.5 | 0.6 | 0.7 | 1   | 0.7 | 0.6 | 0.5 |
| 0.5 | 0.6 | 0.7 | 0.7 | 0.7 | 0.6 | 0.5 |
| 0.5 | 0.6 | 0.6 | 0.6 | 0.6 | 0.6 | 0.5 |
| 0.5 | 0.5 | 0.5 | 0.5 | 0.5 | 0.5 | 0.5 |

Fig. 8

APPARATUS FOR EVALUATING DIGITAL PICTURE QUALITY

FIELD OF THE INVENTION

The present invention relates to an apparatus for evaluating digital picture quality of a coding device using digital picture compression techniques, particularly to an apparatus for evaluating digital picture quality of a digital video codec (coder-decoder) or a digital image transmission path.

DESCRIPTION OF THE RELATED ART

The assessment of such picture quality can be classified to two methods of subjective evaluation and objective evaluation.

As for the subjective evaluation, there is for example a method of evaluating television picture quality in accordance with ITU-R BT.500-7 Recommendations. According to this method, the television picture is subjectively evaluated by at least 15 assessors for several days. Thus, this subjective evaluation method has problems that work-load accompanied with the test session will become extremely heavy and therefore the cost necessary for the assessment will become very high even when only a few pictures are evaluated. In addition, this subjective evaluation method needs a very long period of time for obtaining the result due to its heavy work-load. Therefore, no assessment of picture quality is possible within a short time period.

As for a conventional objective evaluation, there is a typical method using a SNR (Signal to Noise Ratio) which is calculated from simple differences, such as mean square errors, between pixel signals in an original picture and corresponding pixel signals in a picture to be evaluated. This objective evaluation method can derive evaluated result within a short time period. However, because no human visual perception characteristics is considered, the derived result of evaluation according to this method may be frequently differed from the result of the subjective evaluation method.

Another objective evaluation method using a WSNR (Weighted Signal to Noise Ratio) which is weighted in accordance with a human visual perception, considering that the difference between the results of the evaluation using the SNR and of the subjective evaluation is caused by visually conspicuous noises generated on the background, is known. The objective evaluation methods using the WSNR are described for example in S. Hangai, T. Wada and K. Miyauchi, "Experimentally Derived Weighting Function in Spatial Frequency Domain for Evaluating Still Picture", Proc. of The Institute of Image Information and Television Engineers, Vol. 46, No. 3, pp. 295–299, 1992 and T. Hamada, S. Matsumoto and in H. Murakami, "The Marginal Performance of Motion Compensated DCT Coding Scheme Based on Optimized Quantizer", Proc. of The Institute of Electronics, Information and Communication Engineers, B-I, Vol.J78-B-I, No. 11, pp. 689–699, Jan. 1995.

According to this known objective evaluation method, it is considered that whether generated noises are visually conspicuous with respect to the background of each block in the frame. However, since no visual perception characteristics with respect to the background of the whole frame is considered in this method, the evaluated result represented by the obtained WSNR may greatly differ from that of the subjective evaluation.

SUMMARY OF THE INVENTION

It is therefore an object of the present invention to provide a low cost apparatus for evaluating digital picture quality, whereby evaluation can be achieved in a short period of time and also the evaluated result is close to that of the subjective evaluation.

According to the present invention, an apparatus for evaluating digital picture quality includes a SNR calculation module for calculating a SNR based upon differences between data of video picture to be evaluated and data of original video picture, a module for calculating a power of AC component of overall data of one of the video pictures in a frame, and a weighting module for weighting the calculated SNR based upon the calculated power of the AC component.

Since the evaluation apparatus according to the present invention considers for evaluation of picture quality the characteristics of visual perception with respect to the background over the whole picture by weighting the SNR with the power of AC component of overall video data of the picture, it is possible to finally obtain an excellent evaluated result which is closer to that of the subjective evaluation. If evaluating picture quality base upon a SNR (WSNR) considering only visual perception characteristics for each block in a frame, its result will differ from the actual picture quality, depending upon whether that block is noticeable over the whole frame or not. Thus, by introducing the power of AC component of overall video data of the picture, which power represents the global activity of the whole frame, the amount of visual striking with respect to each block can be taken into account causing the evaluated result to close to the subjective evaluation result.

It is preferred that the SNR calculation module includes a module for calculating a SNR overall the frame by calculating, for each block of the frame, differences between the data of the video picture to be evaluated and the data of the original video picture.

It is also preferred that the apparatus further includes a coefficient calculation module for calculating weighting coefficients used for weighting the data of the video picture to be evaluated and the data of the original video picture for each block in the frame based upon characteristics of human visual perception, and that wherein the SNR calculation module calculates the SNR based upon the differences by weighting with the weighting coefficients from the coefficient calculation module.

The coefficient calculation module may include a module for calculating the weighting coefficients for each block in the frame based upon the characteristics of visual sensitivity across spatial frequencies. Since high-frequency noise is less perceptible, the evaluated result obtained by weighting based upon the characteristics of visual sensitivity across spatial frequencies will be close to that of the subjective evaluation.

The coefficient calculation module may include a module for calculating the weighting coefficients for each block in the frame based upon the noise masking effect. Since noise in high activity block is less perceptible, the evaluated result obtained by weighting based upon the noise masking effect will be close to that of the subjective evaluation.

It is preferred that the weighting module includes a module for weighting using a mapping function with coefficients each of which is predetermined based upon the calculated power of the AC component.

According to the present invention, furthermore, an apparatus for evaluating digital picture quality includes a module for providing gaze point information which indicates a position of a gaze point related to a video picture to be evaluated, and a SNR calculation module for calculating a SNR of pixels at and around the gaze point position indicated by the gaze point information, based upon differences between data of the video picture to be evaluated and data of a original video picture.

Since the evaluation apparatus obtains the evaluated result of picture quality by calculating a SNR based upon differences between video data values and original video data values with respect to pixels located at and around the gaze point. Thus, it is considered whether noise occurs at a relatively striking position or nonstriking position in the picture causing the evaluated result to close to that of the subjective evaluation.

It is preferred that the apparatus further includes a module for weighting the data of the video picture to be evaluated and the data of the original video picture with respect to pixels at and around the gaze point position indicated by the provided gaze point information based upon the characteristics of visual sensitivity around the centered gaze point, and that the SNR calculation module calculates the SNR based upon the differences between the weighted data of the video picture to be evaluated and the weighted data of the original video picture. Thus, the evaluation will take into account the characteristics of human visual perception at and around the centered gaze point, and therefore the evaluated result closer to that of the subjective evaluation can be obtained.

It is also preferred that the apparatus further includes a gaze point information judgment module for judging whether the provided gaze point information is effective or noneffective, and for allowing the SNR calculation module to calculate the SNR only when it is judged as effective. Thus, the calculation of this SNR calculation module can be adaptively controlled so that this SNR calculation is not executed when the picture condition is unappropriated causing the evaluated result to close to that of the subjective evaluation.

The gaze point information judgment module may include a module for judging whether the provided gaze point information is effective or noneffective, based upon a distance between a gaze point position in the current frame of the original video picture and a gaze point position in the previous frame, and upon a distance between the gaze point position in the previous frame and a corresponding position in the current frame which is derived by movement-compensating the gaze point in the previous frame.

It is preferred that the gaze point information judgment module includes a module for judging that the provided gaze point information is effective only when a distance between a gaze point position in the current frame of the original video picture and a gaze point position in the previous frame is shorter than a threshold distance which defines pursuable limit in distance for observing a target between two frames, and a distance between the gaze point position in the previous frame and a corresponding position in the current frame which is derived by movement-compensating the gaze point in the previous frame is shorter than the threshold distance. Thus, the calculation of the SNR calculation module is not executed when the moving velocity of the target or of the gaze point is more than velocity limit of human eye movement causing the evaluated result to close to that of the subjective evaluation.

According to the present invention, also, an apparatus for evaluating digital picture quality includes a module for providing gaze point information which indicates a position of a gaze point related to a video picture to be evaluated, a module for calculating a power of AC component of overall data of one of the video picture to be evaluated and a original video picture in a frame, a module for comparing the calculated power of AC component with a threshold value so as to judge whether a gaze point information based control is to be executed or not, a SNR calculation module for calculating a SNR of pixels at and around the gaze point position indicated by the gaze point information, based upon differences between data of the video picture to be evaluated and data of the original video picture when it is judged that the gaze point information based control is to be executed, the SNR calculation module calculating a SNR based upon differences between data of the video picture to be evaluated and data of the original video picture when it is judged that the gaze point information based control is not to be executed, and a weighting module for weighting the calculated SNR based upon the calculated power of the AC component.

When the power of AC component of overall data of the video picture (frame activity) is less than the threshold value, there will be an object or a few objects in the picture and thus the observer will gaze the object(s). Therefore, in this case, the evaluation value is calculated with executing the weighting of the pixels at and around the gaze point. On the other hand, when the frame activity is equal to or more than a threshold value, the picture will be complicated and thus the gaze points will be dispersed. Therefore, in this case, the evaluation value is calculated with executing only the weighting according to the frame activity.

Further objects and advantages of the present invention will be apparent from the following description of the preferred embodiments of the invention as illustrated in the accompanying drawings.

DESCRIPTION OF THE PREFERRED EMBODIMENTS

Figure 1:
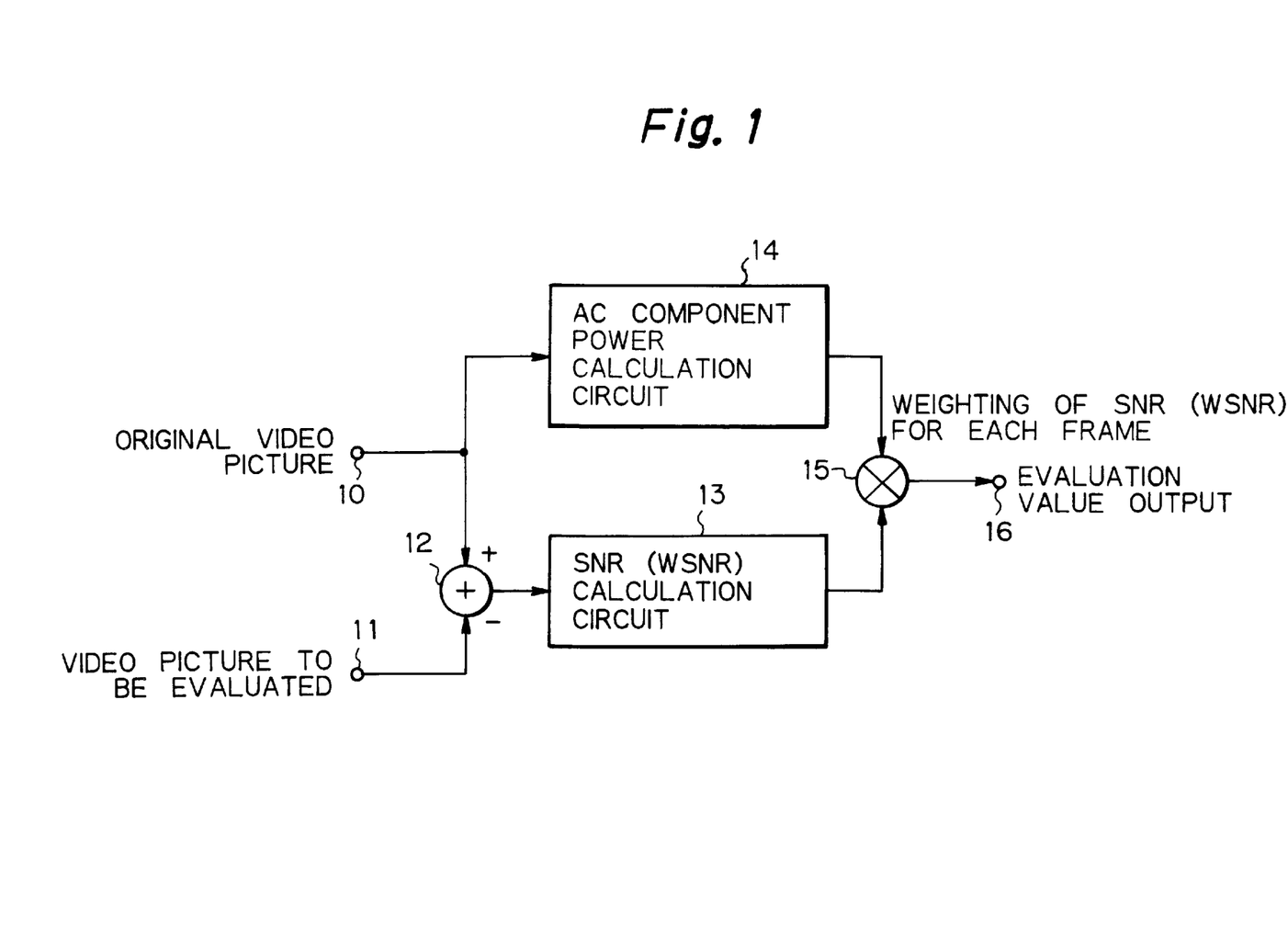
FIG. 1 shows a block diagram illustrating a principal configuration of a digital picture quality evaluation apparatus according to the present invention.

FIG. 1 illustrates a principal configuration of a digital picture quality evaluation apparatus according to the present invention.

In the figure, reference numeral 10 denotes an input terminal for receiving pixel signals of an original video picture corresponding to a video picture to be evaluated, 11 denotes an input terminal for receiving pixel signals of the video to be evaluated (reconstructed video picture after being digitally compressed), 12 denotes a subtraction circuit connected to the input terminals 10 and 11 for calculating the difference, 13 denotes a SNR (WSNR) calculation circuit connected to the output of the subtraction circuit 12, 14 denotes an AC (Alternate Current) component power calculation circuit for calculating an average value of power of overall AC component of a frame, 15 denotes a weighting circuit connected to the SNR calculation circuit 13 and the AC component power calculation circuit 14, and 16 denotes an output terminal of an evaluation value of picture quality, respectively.

The subtraction circuit 12 calculates differences of the pixel signals between the original video and the reconstructed video. The calculated differences are applied to the SNR calculation circuit 13 to obtain a SNR or WSNR (weighted SNR to consider characteristics of human visual perception in each of blocks) over the whole frame. On the other hand, the AC component power calculation circuit 14 calculates an average value of power of overall AC component of the frame (global activity of a picture, frame activity) from the pixel signals of the original video picture. At the weighting circuit 15, the overall SNR or WSNR is weighted for each frame based upon the calculated average value of the AC component power by using a predetermined function. Thus, an evaluated result close to the subjective evaluation result can be obtained from the output terminal 16. In the aforementioned example of FIG. 1, the AC component power calculation circuit 14 calculates the global activity of a picture from the pixel signals of the original video picture. However, it is possible to obtain the substantially similar advantages by calculating the global activity of a picture from the pixel signals of the reconstructed video picture.

Figure 2:
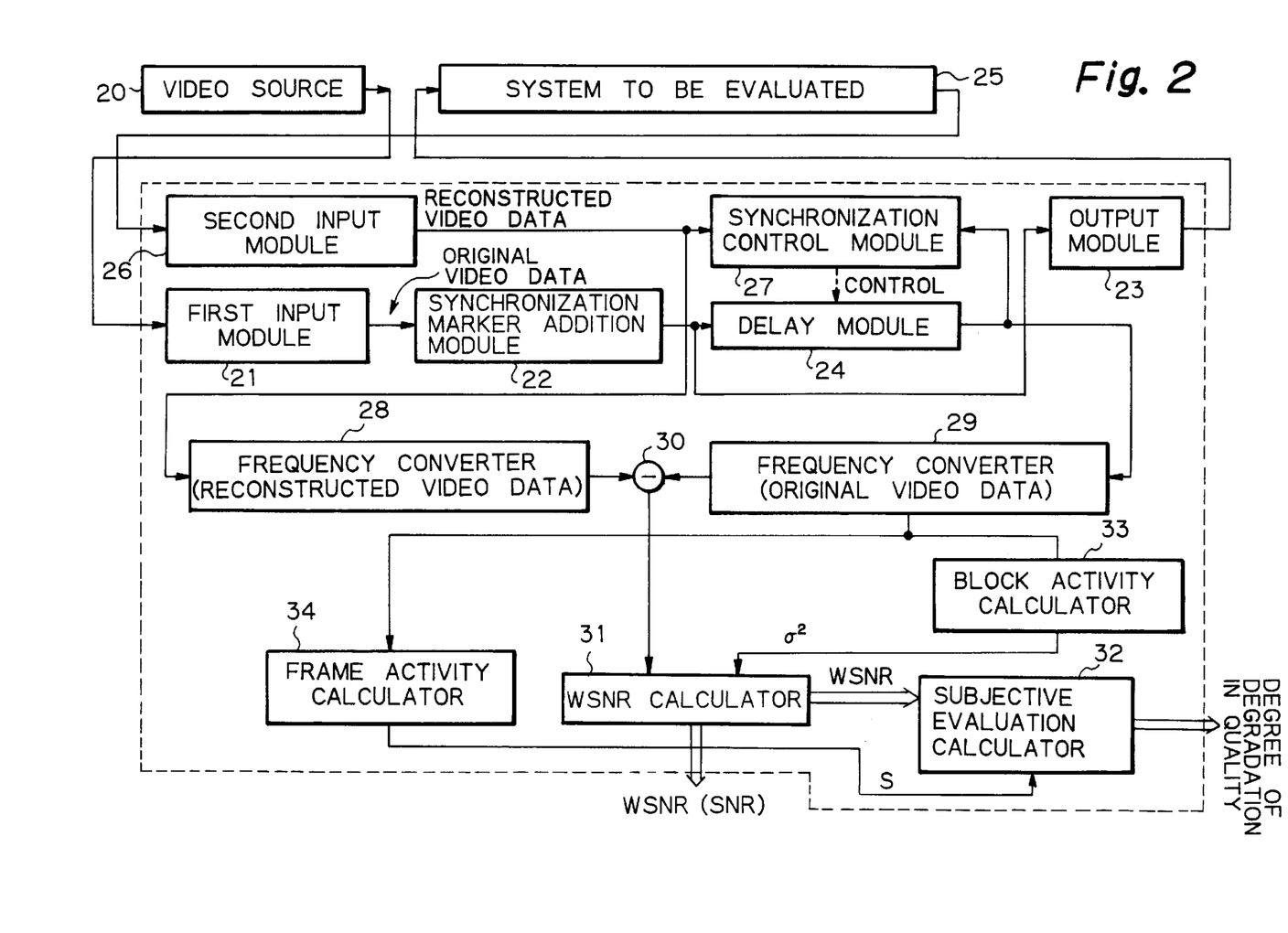
FIG. 2 shows a block diagram schematically illustrating a preferred embodiment of the digital picture quality evaluation apparatus according to the present invention.

FIG. 2 schematically illustrates a preferred embodiment of the digital picture quality evaluation apparatus according to the present invention.

In the figure, reference numeral 20 denotes a video source, 21 denotes a first input module which receives original video picture signals such as for example NTSC composite signals from the video source 20, 22 denotes a synchronization marker addition module connected to the output of the first input module 21, 23 denotes an output module connected to the output of the synchronization marker addition module 22, 24 denotes a delay module connected also to the output of the synchronization marker addition module 22, 25 denotes a system such as a digital video codec or a digital image transmission path of which video picture quality is to be evaluated, 26 denotes a second input module which receives video picture signals to be evaluated (reconstructed video signals), and 27 denotes a synchronization control module which receives reconstructed video data from the second input module 24 and receives delayed original video data from the delay module 24, respectively.

In FIG. 2, furthermore, reference numeral 28 denotes a frequency converter for the reconstructed video data connected to the output of the second input module 26, 29 denotes a frequency converter for the original video data connected to the output of the delay module 24, 30 denotes a subtracter connected to the outputs of the frequency converters 28 and 29, 31 denotes a WSNR calculator connected to the output of the subtracter 30, for calculating WSNR, 32 denotes a subjective evaluation calculator connected to the WSNR calculator 31, for obtaining a subjective evaluation value which indicates the amount of degradation in quality, 33 denotes a block activity calculator connected to the output of the frequency converter 29, for calculating a block activity of each of blocks in the frame and for applying the calculated activity to the WSNR calculator 31, and 34 denotes a frame activity calculator connected to the output of the frequency converter 29 also, for calculating a global activity of the frame and for applying the calculated frame activity to the subjective evaluation calculator 32, respectively.

The original video picture signals from the video source 20 are applied to the first input module 21. At the input module 21, the applied analog signals are A/D converted into 8 bits video data with sampling clocks of $4f_{sc}$ (14.318 MHz) in case the video picture signals to be evaluated are NTSC composite signals for example, and then field merged to have picture data of effective pixels with 768 pixels×483 lines. If the video picture signals to be evaluated are component (Y) signals, the sampling frequency will be 13.5 MHz and the effective pixels with 720 pixels×480 lines, whereas if it is component (Cb, Cr) signals, the sampling frequency will be 6.75 MHz and the effective pixels with 360 pixels×480 lines. The video picture signals to be evaluated may be D1 digital signals other than the NTSC composite signals and the component signals. The system to be evaluated 25 may be a codec of MUCCS-2[2] or MUCCS-45[3] which has been developed by the applicants, MPEG-1, MPEG-2, MPEG-4 or other general coders.

The original video data from the first input module 21 are marked with a synchronization marker at the synchronization marker addition module 22. The pattern of the marker varies with each frame and thus the marker is used to know the delayed amount of the system to be evaluated 25. The original video data with the markers are stored in a memory in the delay module 24. At the same time, the frames with the markers are applied to the system to be evaluated 25 via the output module 23.

The compressed and reconstructed video picture signals to be evaluated (reconstructed video picture signals) from the system 25 are applied to the second input module 26 and then the obtained reconstructed video data are applied to the synchronization control module 27. Thus, at the synchronization control module 27, the marked frames of the reconstructed video data and of the original video data stored in the delay module 24 are compared with each other. As a result, the frame delay of the system to be evaluated 25 is determined. Then, the synchronization module 27 corrects positional divergence of pixels in the frame. These operations provide the synchronization between the original video data and the reconstructed video data, needed for the evaluation.

Thereafter, at the frequency converters 28 and 29, the subtracter 30, the WSNR calculator 31, the block activity calculator 33, and the frame activity calculator 34, the WSNR and the frame activity S are calculated.

Figure 3:
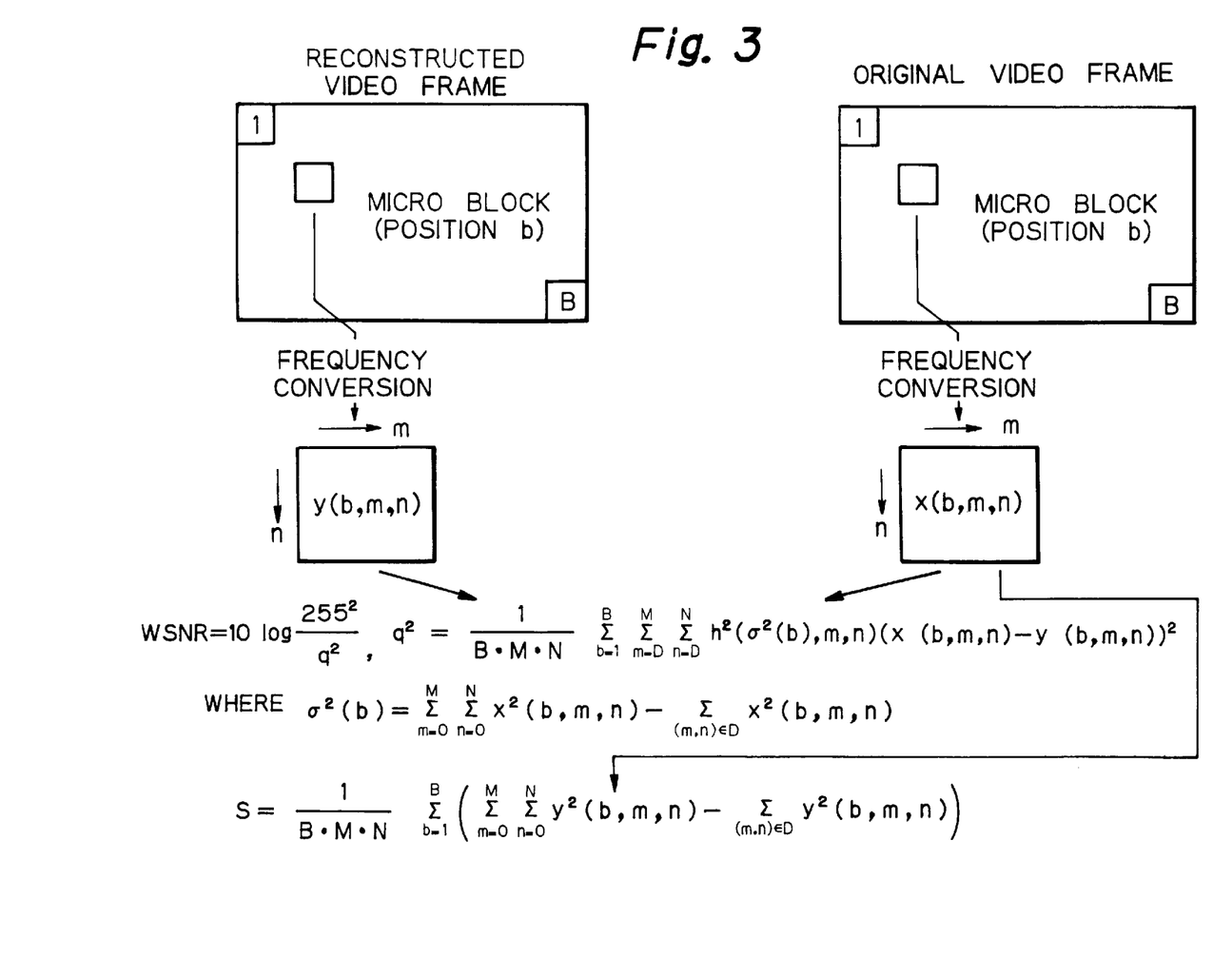
FIG. 3 shows a view illustrating in detail contents of calculations of a WSNR and a frame activity S in the embodiment of FIG. 2.

FIG. 3 illustrates in detail contents of these calculations of WSNR and frame activity S. In order to effectively consider characteristics of human visual perception, the frequency converters 28 and 29 conduct signal analysis of each micro block unit of the reconstructed video data and the original video data by converting their frequency using for example the Hadamard transform. If the Hadamard transform is used for the NTSC signals, color sub-carrier components will be effectively appeared at only two coefficients, and thus signal analysis of the NTSC signals can become easier in view of its frequency configuration. Fourier transform or DCT (Discrete Cosine Transform) may be alternatively used for the frequency conversion other than the Hadamard transform. The frequency-converted each block data are applied to the subtracter 30 and thus difference power values (square error) between the original video data and the reconstructed video data are obtained. The obtained difference power value for each transform coefficient (m,n) of the block b is applied to the WSNR calculator 31 wherein a WSNR considering the following characteristics of visual perception is calculated.

For evaluating picture quality, human visual perception characteristics of (1) the variations of the visual sensitivity to noise across the spatial frequencies (high-frequency noise is less perceptible) and (2) the noise masking effect (noise in high activity block is less perceptible) should be considered for each block. Therefore, the Hadamard transform coefficients (m,n) are weighted with the visual sensitivity matrix H to satisfy (1), and the activity (dispersion value) $\sigma^2(b)$ of the block b is weighted to satisfy (2). Namely, the weighting of $$h(\sigma^2, m,n)=h_1(\sigma^2(b)) \cdot H(m,n)$$

is carried out, where $h_1(\sigma^2)$ is a noise sensitivity function with respect to the activity $\sigma^2(b)$ of the block b.

As for the visual sensitivity matrix H, the Hadamard transform coefficients weighted so that the coefficients which will provide substantially the same degradation degree by truncation are arranged to a single cluster and that subjective degradation degrees due to noise produced in the respective clusters become equal to each other can be used.

The block activity $\sigma^2(b)$ of the block b is the power consisting of only the AC component excluding the DC (Direct Current) component and the color sub-carrier components ((m,n) D), and calculated by the following equation at the block activity calculator 33.

$$\sigma^2(b) = \sum_{m=0}^{M}\sum_{n=0}^{N} x^2(b, m, n) - \sum_{(m,n)\in D} x^2(b, m, n)$$

As shown in FIG. 3, the WSNR over the whole frame is calculated by the following equations in which difference of power of each transform coefficient (m,n) of the block b $(x(b,m,n)-y(b,m,n))^2$ is weighted with the human visual perception characteristics $h(\sigma^2,m,n)$, at the WSNR calculator 31.

$$WSNR = 10\log\frac{255^2}{q^2}$$

$$q^2 = \frac{1}{B \cdot M \cdot N}\sum_{b=1}^{B}\sum_{m=D}^{M}\sum_{n=D}^{N} h^2(\sigma^2(b), m, n) \cdot (x(b, m, n) - y(b, m, n))^2$$

At the frame activity calculator 34, as shown in FIG. 3, the power over the whole frame, which consists of only the AC component excluding the DC component and the color sub-carrier components ((m,n) D), namely the frame activity S is calculated by the following equation. In this embodiment, the frame activity calculator 34 calculates the global activity of picture from the original video data. However, it is possible to obtain the substantially similar advantages by calculating the global activity of picture from the reconstructed video data.

$$S = \frac{1}{B \cdot M \cdot N}\sum_{b=1}^{B}\left(\sum_{m=0}^{M}\sum_{n=0}^{N} y^2(b, m, n) - \sum_{(m,n)\in D} y^2(b, m, n)\right)$$

The WSNR considering the visual perception characteristics in each block provided from the WSNR calculator 31 is weighted with the frame activity S which takes into account the visual perception characteristics in the overall frame to output a degree of degradation in picture quality (%), at the subjective evaluation calculator 32.

The noise masking effect is taken into consideration in this apparatus by weighting with $h(\sigma^2,m,n)$ at the WSNR calculator 31 because perceptivity of human vision with respect to noise produced in the block will vary depending upon the activity of that block. In addition to this block activity, the evaluation apparatus in this embodiment uses the global activity of the frame S for evaluation of picture quality. This is because the following reasons. It has been experimentally confirmed by the applicants that the degree of visual attention to each block is influenced by the frame activity S. For example, if the global activity of the picture S is high, noise tends to be less noticeable even when it is easy to be locally perceived due to high block activity. Contrary to this, if the global activity of the picture S is low, the noise tends to be very noticeable. Therefore, according to this embodiment, the calculation of the degree of degradation in quality at the subjective evaluation calculator 32 uses an experimentally predetermined mapping function f classified into several kinds depending upon the global activity of the picture S so as to provide the amount of degradation in quality as close to the subjective evaluation value as possible.

The degradation amount in quality f(x) is calculated by the following mapping function of the fifth degree, where x is the WSNR value.

$$f(x)=px^5+qx^4+rx^3+sx^2+tx+u$$

The coefficients p to u of this mapping function are determined depending upon the activity S as indicated in Table 1. These coefficients are experimentally obtained by the method of the least squares so that the calculated degradation amount in quality closes to the subjective evaluation value.

TABLE 1

| | Coefficients of the mapping function | | | | | |
|---|---|---|---|---|---|---|
| S | p | q | r | s | t | u |
| S < 100 | −0.00000210 | 0.000340 | −0.0178 | 0.279 | 1.26 | 0.00269 |
| S < 250 | −0.00000732 | 0.00122 | −0.0729 | 1.80 | −14.5 | −0.0000156 |
| S < 400 | −0.0000791 | 0.0111 | −0.570 | 12.7 | −101 | −0.00000525 |
| S ≧ 400 | −0.00000135 | −0.000235 | 0.0154 | −0.455 | 5.22 | 0.0129 |

Hereinafter, result of evaluation test of picture quality using the apparatus in this embodiment will be described. In the evaluation test, 16 kinds of NTSC pictures are used for the original video picture, and two kinds of codecs MUCCS-2[2] and MUCCS-45[3] which have been developed by the applicants are used for the system to be evaluated. Coding bit rate is 22 Mbps and 15 Mbps for both the codecs. Subjective evaluation values used as reference values for the evaluation test are obtained by subjective evaluation executed with respect to the same test pictures by 20 evaluators in accordance with ITU-R BT.500-6 Recommendations.

Figure 4:
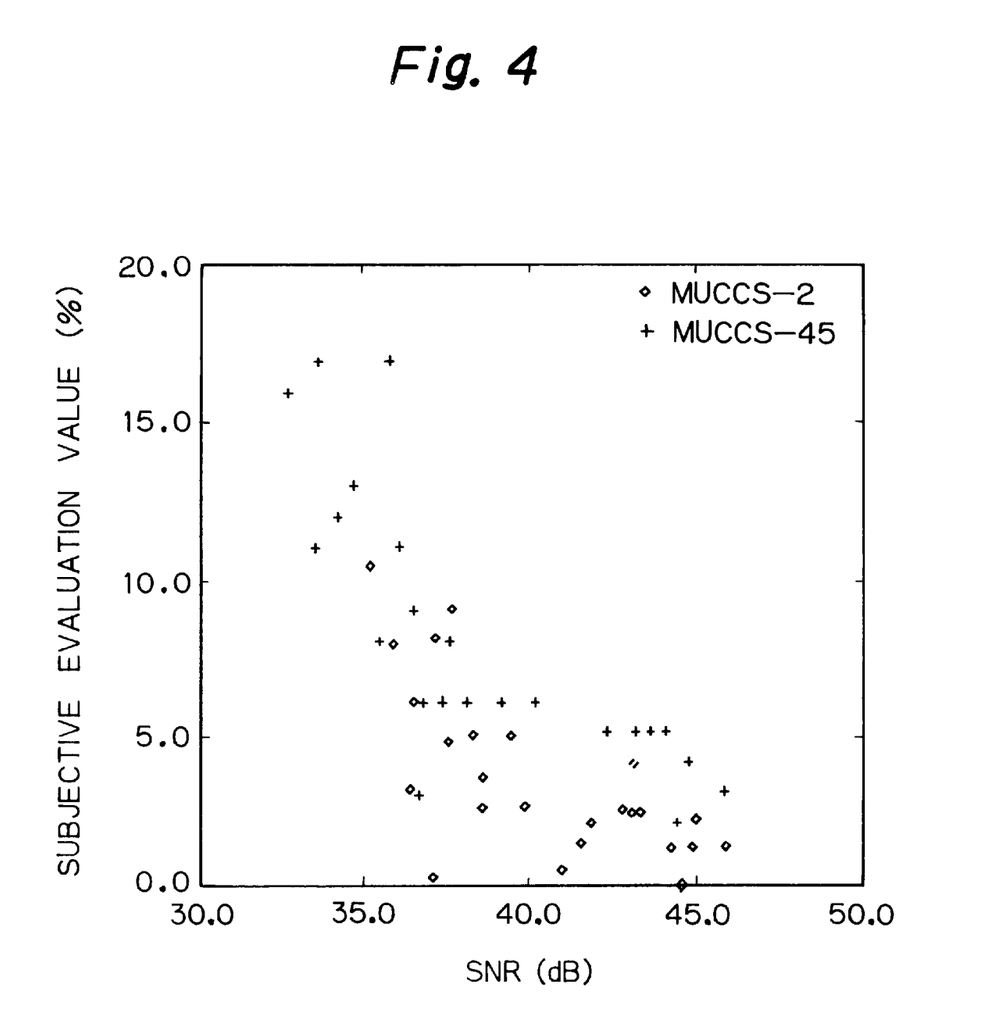
FIG. 4 shows a relationship between a simple SNR value and a subjective evaluation value, as for the result of a picture quality evaluation test.
Figure 5:
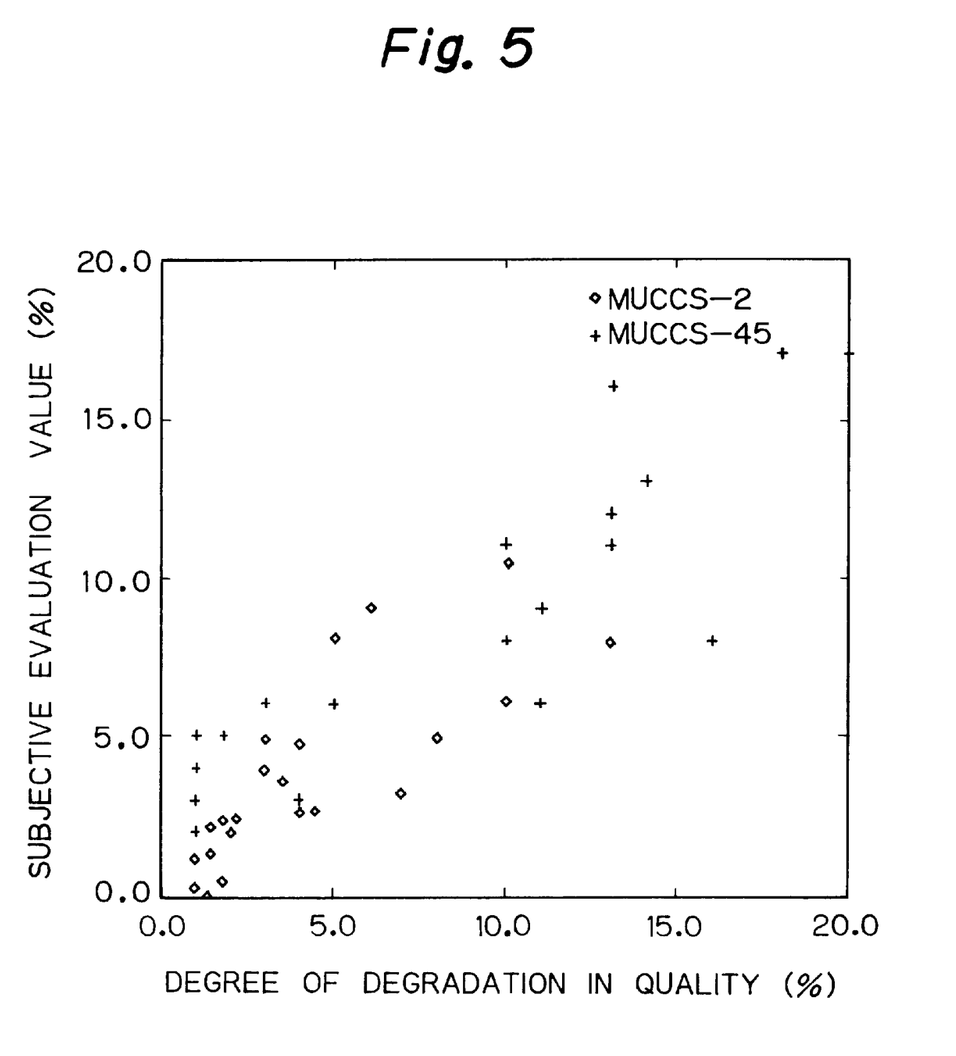
FIG. 5 shows a relationship between a degree of degradation in quality and a subjective evaluation value according to the embodiment of FIG. 2, as for the result of a picture quality evaluation test.

FIG. 4 illustrates a relationship between a simple SNR value (SNR without weighting based upon visual perception characteristics) and the above-mentioned subjective evaluation value, and FIG. 5 illustrates a relationship between a degree of degradation in quality f(x) and the subjective evaluation reference value according to this embodiment.

When the picture quality is evaluated by the simple SNR, because characteristics of human visual perception is not considered, plots are dispersed as shown in FIG. 4, and therefore correlation coefficients of relationships between the calculated SNR and the subjective evaluation value are low such as 0.680 for MUCCS-2[2] and 0.743 for MUCCS-45[3].

On the other hand, when it is evaluated by the degree of degradation in quality according to the embodiment, although it is not perfectly proportional, correlation coefficients of relationships between the calculated evaluation value and the subjective evaluation value are extremely higher than these by using the simple SNR, as 0.804 for MUCCS-2[2] and 0.912 for MUCCS-45[3]. Since the visual sensitivity of noise occurred in the gaze block is taken into account for evaluation by calculating the degree of degradation in quality in accordance with the global activity of the frame S, the calculated evaluation value was approached more closely to the subjective evaluation value.

Since the evaluation apparatus in this embodiment considers for evaluation of picture quality not only visual perception characteristics with respect to noise produced in the block but also visual perception characteristics over the whole picture, a precise evaluated result which is closer to the subjective evaluation result can be obtained. Also, evaluation can be achieved in a short period of time and a simple configuration of the evaluation apparatus can be achieved causing a lower manufacturing cost.

As described in detail, according to the present invention, the evaluation apparatus has a SNR calculation module for calculating a SNR based upon differences between video data values and original video data values, a module for calculating a power of AC component of overall video data in a frame, and a weighting module for weighting the calculated SNR based upon the calculated power of the AC component. Thus, evaluation can be achieved in a short period of time and the evaluated result is close to that of the subjective evaluation.

Figure 6:
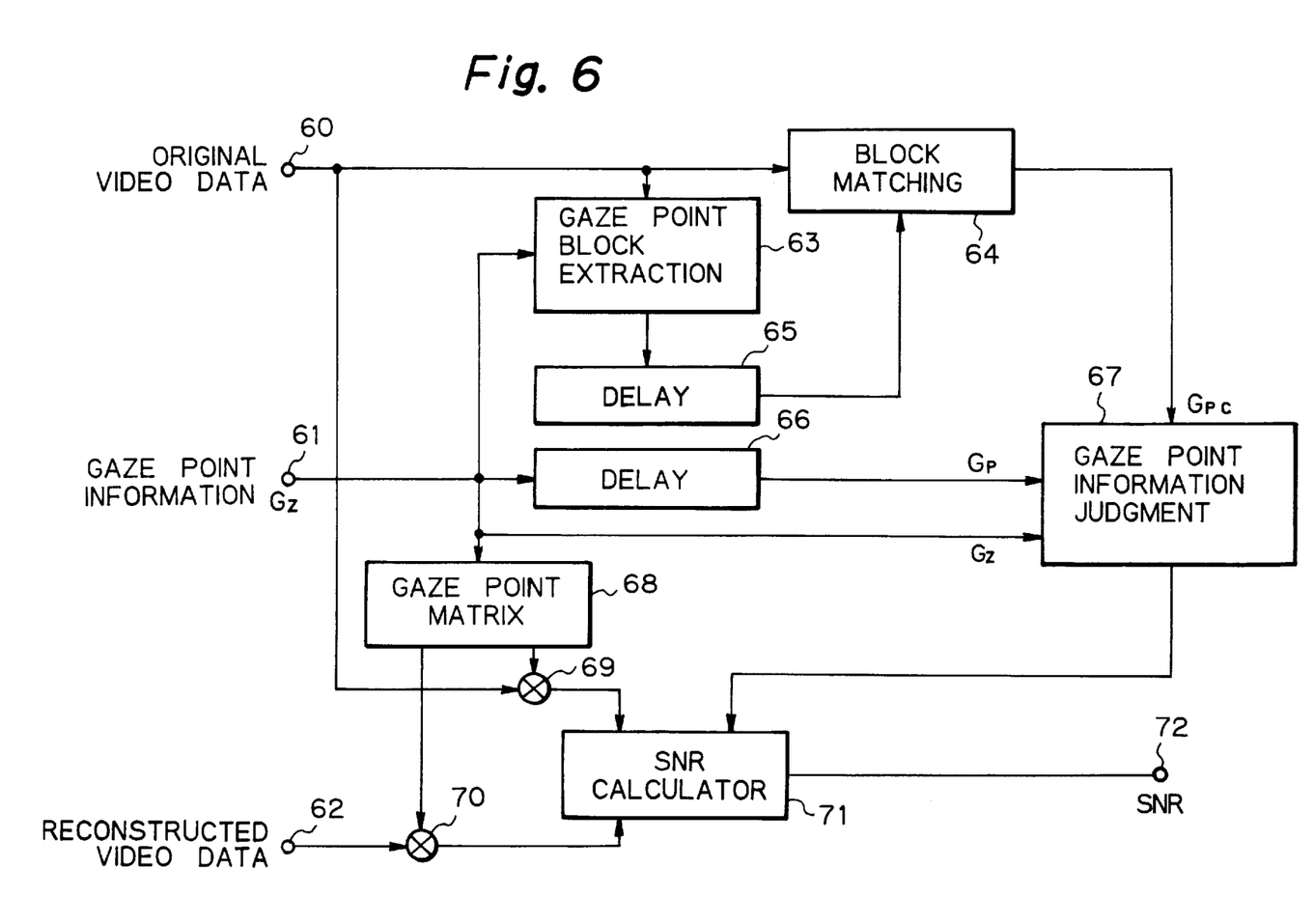
FIG. 6 shows a block diagram schematically illustrating another embodiment of the digital picture quality evaluation apparatus according to the present invention.

FIG. 6 illustrates another embodiment of the digital picture quality evaluation apparatus according to the present invention.

In the figure, reference numeral 60 denotes an input terminal which receives pixel data of an original video picture (original video data) is provided, 61 denotes an input terminal which receives gaze point information with respect to a video picture to be evaluated, 62 denotes an input terminal which receives pixel data of the video picture to be evaluated (reconstructed video data), 63 denotes a gaze point block extraction circuit connected to the input terminals 60 and 61, 64 denotes a block matching circuit connected to the input terminal 60, 65 denotes a delay circuit connected between the extraction circuit 63 and the block matching circuit 64, for providing a one frame delay, 66 denotes a delay circuit connected to the input terminal 61, for providing a one frame delay, 67 denotes a gaze point information judgment circuit connected to the block matching circuit 64, to the delay circuit 66 and to the input terminal 61, 68 denotes a gaze point matrix circuit connected to the input terminal 61, 69 and 70 denote multipliers connected to the gaze point matrix circuit 68 and to the input terminals 60 and 62, 71 denotes a SNR calculator connected to the multipliers 69 and 70 and to the gaze point information judgment circuit 67, and 72 denotes a SNR output terminal connected to the SNR calculator 71, respectively.

The original video data through the input terminal 60 are applied to the multiplier 69, and the reconstructed video data through the input terminal 61 are applied to the multiplier 70. To these multipliers 69 and 70, gaze point matrix coefficients are provided from the matrix circuit 68. Thus, each pixel of the original video data and of the reconstructed video data are multiplied by the coefficients, and the results are applied to the SNR calculator 71.

The gaze point matrix coefficients are weighted to take into account the characteristics of human visual perception. Namely, the coefficients are determined so that only a plurality of pixels at and around the gaze point $G_z$ which is determined based upon the gaze point information provided to the input terminal 61 are extracted, and that they are gradually reduced with leaving from the centered gaze point.

Figure 7:
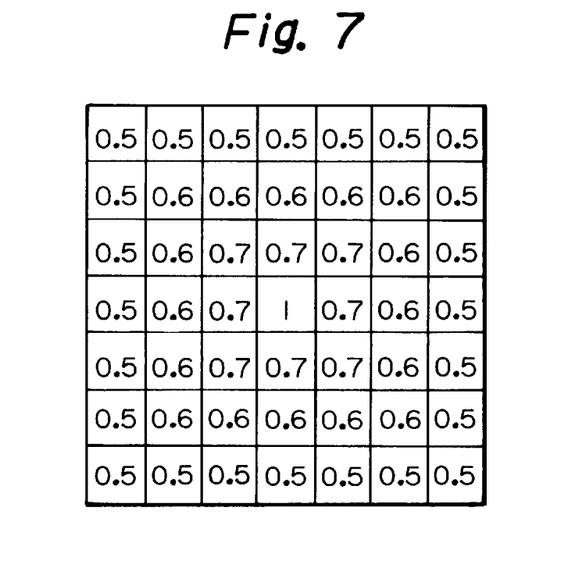
FIG. 7 shows an example of a gaze point matrix.

FIG. 7 shows an example of the gaze point matrix coefficients. In this example, the pixel information in a region within an observation angle of 10 degrees relative to the normal on the gaze point are extracted and the weighting is taken into account the characteristics of human visual perception. Each block in FIG. 7 represents 16×16 pixels. It should be noted that all the coefficients outside this matrix are zero.

The SNR calculator 71 calculates a SNR, namely the sum of differences (mean square error for example) between the weighted original video data values from the multiplier 69 and the weighted reconstructed video data values from the multiplier 70, corresponding to only the pixels at and around the gaze point $G_z$. The calculated SNR is output from the output terminal 72 as an objective evaluated result.

Figure 8:
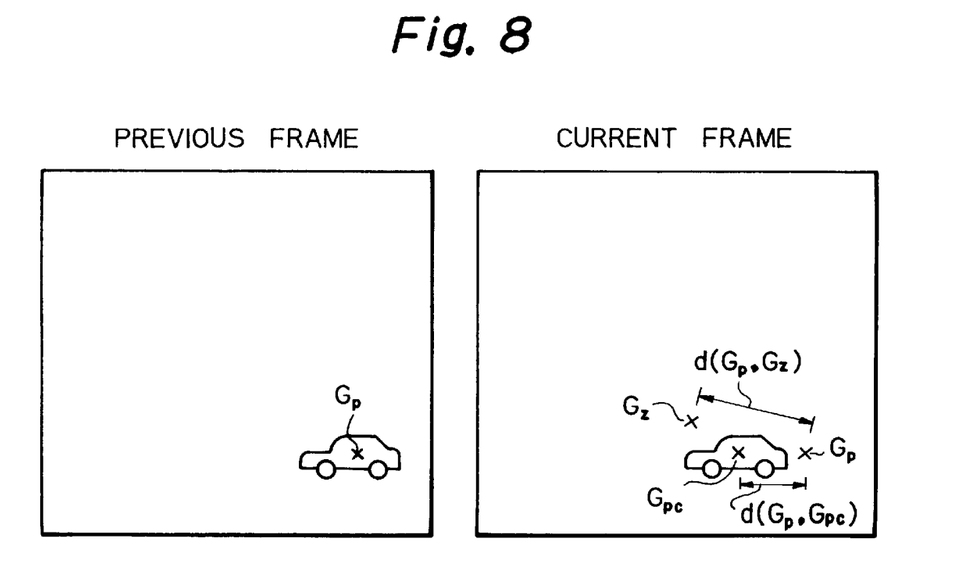
FIG. 8 shows a view illustrating a position and a distance of each gaze point when judging whether gaze point information is effective or noneffective.

It is to be noted that this SNR calculator 71 is allowed to execute the above-mentioned calculation of the SNR only when the gaze point information is effective, and no calculation is executed when the gaze point information is noneffective. Hereinafter, operation of effective/noneffective judgment for the gaze point information will be described with reference to FIG. 8 illustrating an example of positions of the gaze point in the previous frame and the present frame.

The gaze point block extraction circuit 63 receives the original video data of the current frame through the input terminal 60 and extracts video data within the gaze point block which is constituted by pixels located at and around the gaze point $G_z$ of the current frame. The extracted video data within the gaze point block are delayed for one frame period of time at the delay circuit 65, and then applied to the block matching circuit 64. The block matching circuit 64 further receives the original video data of the current frame, and executes the block matching operation for obtaining a position $G_{pc}$ in the current frame corresponding to the previous frame's gaze point position $G_p$. This corresponding position $G_{pc}$ in the current frame can be derived by movement-compensating the previous frame's gaze point.

The obtained corresponding position $G_{pc}$, the gaze point position in the current frame $G_z$ represented by the gaze point information, and the previous frame's gaze point position $G_p$ which can be obtained by delaying the gaze point information for one frame period of time at the delay circuit 65 are applied to the gaze point information judgment circuit 67 to judge whether the gaze point information is effective or noneffective as follows.

At the judgment circuit 67, firstly, a distance $d(G_p,G_z)$ between the previous frame's gaze point position $G_p$ and the current frame's gaze point position $G_z$, and also a distance $d(G_p,G_{pc})$ between the previous frame's gaze point position $G_p$ and the corresponding gaze point position $G_{pc}$ in the current frame which is derived by movement-compensating the previous frame's gaze point are calculated. Then, the judgment is executed as shown in Table 2 by using the calculated distances $d(G_p,G_z)$ and $d(G_p,G_{pc})$, and using a threshold distance $V_{th} \cdot T_s$ which defines pursuable limit in distance for observing a target between two frames, where $V_{th}$ is a threshold velocity defining pursuable limit in moving velocity for observing the target and $T_s$ is a frame interval of time.

TABLE 2

| | $d\,(G_p \cdot G_z)$ | $d\,(G_p \cdot G_{pc})$ | JUDGMENT |
|---|---|---|---|
| A | $<V_{th} \cdot T_s$ | $<V_{th} \cdot T$ | EFFECTIVE GAZE POINT |
| B | $<V_{th} \cdot T$ | $\geq V_{th} \cdot T$ | NONEFFECTIVE GAZE POINT |
| C | $\geq V_{th} \cdot T$ | $<V_{th} \cdot T$ | NONEFFECTIVE GAZE POINT |
| D | $\geq V_{th} \cdot T$ | $\geq V_{th} \cdot T$ | NONEFFECTIVE GAZE POINT |

As will be apparent from this Table 2, only when $d(G_p,G_z)<V_{th}\cdot T_s$ and $d(G_p,G_{pc})<V_{th}\cdot T_s$, $G_z$ is judged as the effective gaze point (case A). If $d(G_p,G_z)<V_{th}\cdot T_s$ and $d(G_p,G_{pc})\geq V_{th}\cdot T_s$, $G_z$ is judged as the noneffective gaze point (case B). This is because, in this case, movement of the gaze point is slow but the moving velocity of the target is faster than the threshold velocity. If $d(G_p,G_z)\geq V_{th}\cdot T_s$ and $d(G_p,G_{pc})<V_{th}\cdot T_s$, $G_z$ is judged as the noneffective gaze point (case C). This is because, in this case, movement of the target is slow but the moving velocity of the gaze point is faster than the threshold velocity. If $d(G_p,G_z)\geq V_{th}\cdot T_s$ and $d(G_p,G_{pc}) \geq V_{th}\cdot T_s$, $G_z$ is judged as the noneffective gaze point (case D). This is because, in this case, both the moving velocity of the target and the gaze point are faster than the threshold velocity.

The results of simulation tests for evaluating picture quality using the apparatus in this embodiment are as follows. The simulation tests provided a correlation coefficient of relationship between the conventional SNR (SNR obtained from simple differences of all the pixels between the original video frame and the reconstructed video frame) and the subjective evaluation value and a correlation coefficient of relationship between the SNR obtained according to this embodiment and the subjective evaluation value. In the evaluation test, 15 kinds of reconstructed pictures are formed with coding bit rates of 0.45 bit/pel, 0.61 bit/pel and 0.95 bit/pel with respect to 5 kinds of the original test video picture (720 pixels ×480 lines). Subjective evaluation values are obtained by 20 non-expert observers using the double-stimulus continuous-scale (0–100%) evaluation method with the viewing distance of 1H. The threshold velocity $V_{th}$ and the frame interval $T_s$ used for the judgment of the gaze point are determined as $V_{th}=5°/s$ and $T_s=1/30$ s.

The correlation coefficient of relationship between the conventional SNR and the subjective evaluation value, derived by the simulation test, is 0.45, whereas the correlation coefficient of relationship between the SNR obtained according to this embodiment and the subjective evaluation value, also derived by the test, is 0.69 which is extremely better than that by means of the conventional SNR.

Since the evaluation apparatus in this embodiment calculates a SNR derived from video data within a gaze point block, which are extracted in accordance with effective gaze point information corresponding to the moving picture, a precise evaluated result which is closer to the subjective evaluation result. Also, evaluation can be achieved in a short period of time and a simple configuration of the evaluation apparatus can be achieved causing a lower manufacturing cost.

As described in detail, according to the present invention, the evaluation apparatus obtains the evaluated result of picture quality by calculating a SNR based upon differences between video data values and original video data values with respect to pixels located at and around the gaze point. Thus, it is considered whether noise occurs at a relatively striking position or nonstriking position in the picture causing the evaluated result to close to that of the subjective evaluation. Also, evaluation can be achieved in a short period of time and a simple configuration of the evaluation apparatus can be achieved causing a lower manufacturing cost.

Figure 9:
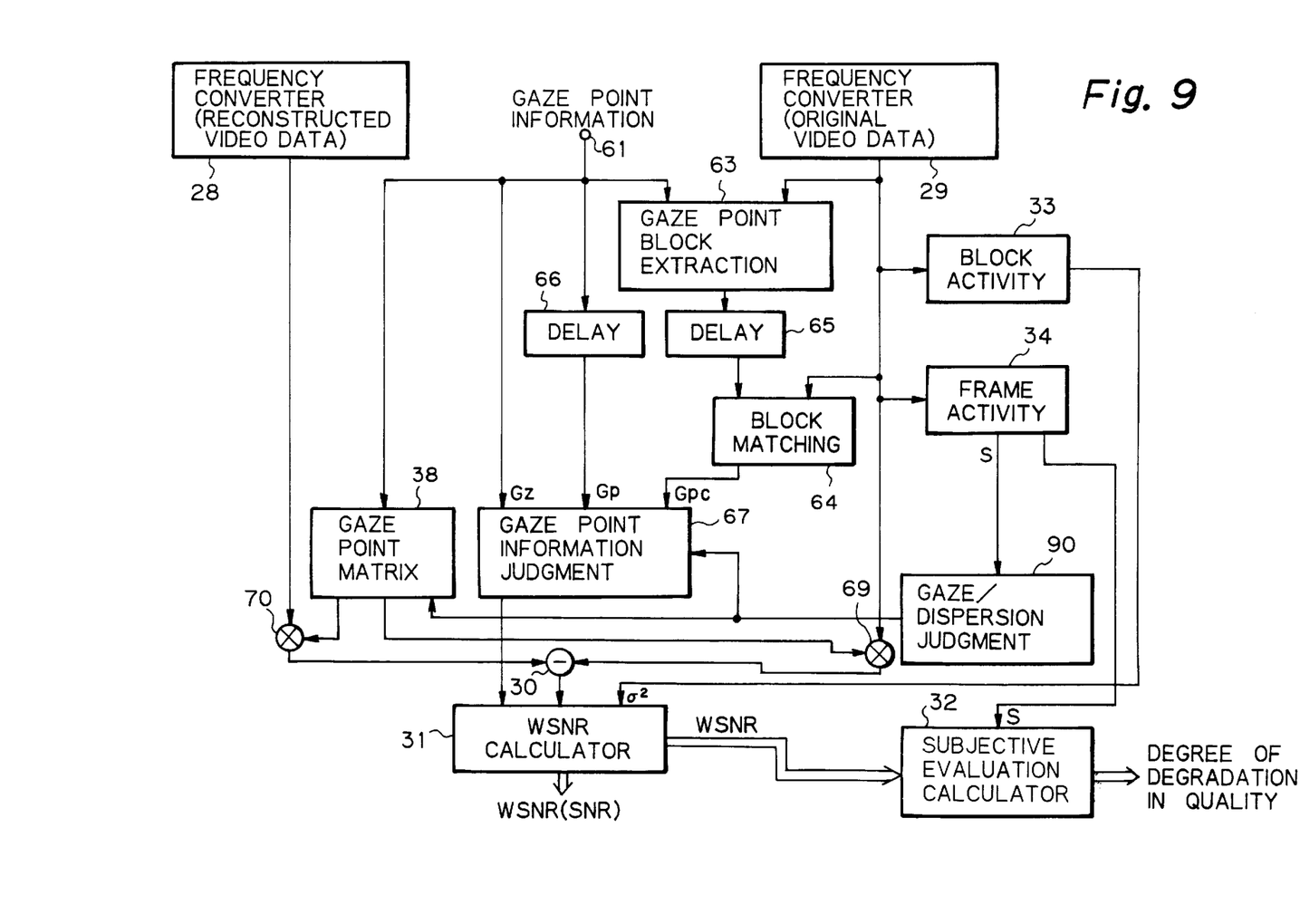
FIG. 9 shows a block diagram schematically illustrating a further embodiment of the digital picture quality evaluation apparatus according to the present invention.

FIG. 9 illustrates a further embodiment of the digital picture quality evaluation apparatus according to the present invention.

In this embodiment, the evaluation apparatus to selectively executes a weighting calculation similar to that in the embodiment of FIG. 6 depending upon the picture characteristics, in addition to a weighting calculation similar to that in the embodiment of FIG. 2.

In FIG. 9, the similar elements as these in FIGS. 2 and 6 have the same reference numerals. In this figure, reference numeral 28 denotes a frequency converter for the reconstructed video data, 29 denotes a frequency converter for the original video data, 61 denotes an input terminal which receives gaze point information with respect to a video picture to be evaluated, 63 denotes a gaze point block extraction circuit connected to the input terminal 61 and to the frequency converter 29, 64 denotes a block matching circuit connected to the frequency converter 29, 65 denotes a delay circuit connected between the extraction circuit 63 and the block matching circuit 64, for providing a one frame delay, 66 denotes a delay circuit connected to the input terminal 61, for providing a one frame delay, 67 denotes a gaze point information judgment circuit connected to the block matching circuit 64, to the delay circuit 66 and to the input terminal 61, 68 denotes a gaze point matrix circuit connected to the input terminal 61, 69 and 70 denote multipliers connected to the gaze point matrix circuit 68 and to the frequency converters 28 and 29, 30 denotes a subtracter connected to the outputs of the frequency converters 28 and 29, 31 denotes a WSNR calculator connected to the output of the subtracter 30, for calculating WSNR, 32 denotes a subjective evaluation calculator connected to the output of the WSNR calculator 31, for obtaining a subjective evaluation value which indicates the amount of degradation in quality, 33 denotes a block activity calculator connected to the output of the frequency converter 29, for calculating a block activity of each of blocks in the frame and for applying the calculated activity to the WSNR calculator 31, and 34 denotes a frame activity calculator connected to the output of the frequency converter 29 also, for calculating a global activity of the frame and for applying the calculated frame activity to the subjective evaluation calculator 32, respectively.

In this embodiment, particularly, a gaze/dispersion judgment circuit 90 for executing a judgment of weighting using the gaze point information, in other words, for judging whether weighting around the gaze point is to be executed is additionally mounted. This judgment circuit 90 is connected to the frame activity calculator 34, to the gaze point information judgment circuit 67 and to the gaze point matrix circuit 68.

The gaze/dispersion judgment circuit 90 outputs a signal indicating that "gaze point weighting is effective" to the gaze point information judgment circuit 67 and to the gaze point matrix circuit 68 so as to calculating the WSNR and the degree of degradation in quality with weighting of the pixels at and around the gaze point when the frame activity S is less than a threshold value. This is because, when the frame activity S is less than a threshold value, there will be an object or a few objects in the picture and thus the observer will gaze the object(s). Therefore, in this case, the evaluation value is calculated with executing the weighting of the pixels at and around the gaze point.

On the other hand, the gaze/dispersion judgment circuit 90 outputs a signal indicating that "gaze point weighting is noneffective" to the gaze point information judgment circuit 67 and to the gaze point matrix circuit 68 so as to calculating the WSNR and the degree of degradation in quality with weighting of the overall pixels in the frame when the frame activity S is equal to or more than a threshold value. This is because, when the frame activity S is equal to or more than a threshold value, the picture will be complicated and thus the gaze points will be dispersed. Therefore, in this case, the evaluation value is calculated with executing only the weighting according to the frame activity S.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for evaluating digital picture quality, comprising:
    a SNR calculation means for calculating a SNR based upon differences between data of video picture to be evaluated and data of original video picture;
    means for calculating an average value of a power of AC component of overall data of one of said video pictures in a frame; and
    a weighting means for weighting the calculated SNR based upon the calculated average value of power of the AC component;
    wherein said weighting means includes means for weighting using a mapping function with coefficients each of which is predetermined based upon said calculated power of the AC component.

2. The apparatus as claimed in claim 1, wherein said SNR calculation means includes means for calculating a SNR overall the frame by calculating, for each block of the frame, differences between the data of said video picture to be evaluated and the data of said original video picture.

3. The apparatus as claimed in claim 1, wherein said apparatus further comprises a coefficient calculation means for calculating weighting coefficients used for weighting the data of said video picture to be evaluated and the data of said original video picture for each block in the frame based upon SNR calculation means calculates the SNR based upon the differences by weighting with the weighting coefficients from said coefficient calculation means.

4. The apparatus as claimed in claim 3, wherein said coefficient calculation means includes means for calculating the weighting coefficients for each block in the frame based upon the characteristics of visual sensitivity across spatial frequencies.

5. The apparatus as claimed in claim 3, wherein said coefficient calculation means includes means for calculating the weighting coefficients for each block in the frame based upon the noise masking effect.

6. An apparatus for evaluating digital picture quality, comprising:
    means for providing gaze point information which indicates a position of a gaze point related to a video picture to be evaluated;
    a SNR calculation means for calculating a SNR of pixels at and around the gaze point position indicated by said gaze point information, based upon differences between data of the video picture to be evaluated and data of a original video picture; and
    means for weighting the data of the video picture to be evaluated and the data of the original video picture with respect to pixels at and around the gaze point position indicated by said provided gaze point information based upon the characteristics of visual sensitivity around the centered gaze point, and
    wherein said SNR calculation means calculates the SNR based upon the differences between the weighted data of the video picture to be evaluated and the weighted data of the original video picture.

7. The apparatus as claimed in claim 6, wherein said apparatus further comprises a gaze point information judgment means for judging whether said provided gaze point information is effective or noneffective, and for allowing said SNR calculation means to calculate the SNR only when it is judged as effective.

8. The apparatus as claimed in claim 7, wherein said gaze point information judgment means includes means for judging whether said provided gaze point information is effective or noneffective, based upon a distance between a gaze point position in the current frame of the original video picture and a gaze point position in the previous frame, and upon a distance between the gaze point position in the previous frame and a corresponding position in the current frame which is derived by movement-compensating the gaze point in the previous frame.

9. The apparatus as claimed in claim 7, wherein said gaze point information judgment means includes means for judging that said provided gaze point information is effective only when a distance between a gaze point position in the current frame of the original video picture and a gaze point position in the previous frame is shorter than a threshold distance which defines pursuable limit in distance for observing a target between two frames, and a distance between the gaze point position in the previous frame and a corresponding position in the current frame which is derived by movement-compensating the gaze point in the previous frame is shorter than said threshold distance.

10. An apparatus for evaluating digital picture quality, comprising:
    means for providing gaze point information which indicates a position of a gaze point related to a video picture to be evaluated;
    means for calculating a power of AC component of overall data of one of the video picture to be evaluated and a original video picture in a frame;
    means for comparing the calculated power of AC component with a threshold value so as to judge whether a gaze point information based control is to be executed or not;
    a SNR calculation means for calculating a SNR of pixels at and around the gaze point position indicated by said gaze point information, based upon differences between data of the video picture to be evaluated and data of the original video picture when it is judged that the gaze point information based control is to be executed, said SNR calculation means calculating a SNR based upon differences between data of the video picture to be evaluated and data of the original video picture when it is judged that the gaze point information based control is not to be executed; and a weighting means for weighting the calculated SNR based upon the calculated power of the AC component.

11. The apparatus as claimed in claim 10, wherein said SNR calculation means includes means for calculating a SNR overall the frame by calculating, for each block of the frame, differences between the data of said video picture to be evaluated and the data of said original video picture.

12. The apparatus as claimed in claim 10, wherein said apparatus further comprises a coefficient calculation means for calculating weighting coefficients used for weighting the data of said video picture to be evaluated and the data of said original video picture for each block in the frame based upon characteristics of human visual perception, and wherein said SNR calculation means calculates the SNR based upon the differences by weighting with the weighting coefficients from said coefficient calculation means.

13. The apparatus as claimed in claim 12, wherein said coefficient calculation means includes means for calculating the weighting coefficients for each block in the frame based upon the characteristics of visual sensitivity across spatial frequencies.

14. The apparatus as claimed in claim 12, wherein said coefficient calculation means includes means for calculating the weighting coefficients for each block in the frame based upon the noise masking effect.

15. The apparatus as claimed in claim 10, wherein said weighting means includes means for weighting using a mapping function with coefficients each of which is predetermined based upon said calculated power of the AC component.

16. The apparatus as claimed in claim 10, wherein said apparatus further comprises means for weighting the data of the video picture to be evaluated and the data of the original video picture with respect to pixels at and around the gaze point position indicated by said provided gaze point information based upon the characteristics of visual sensitivity around the centered gaze point, and wherein said SNR calculation means calculates the SNR based upon the differences between the weighted data of the video picture to be evaluated and the weighted data of the original video picture.

17. The apparatus as claimed in claim 10, wherein said apparatus further comprises a gaze point information judgment means for judging whether said provided gaze point information is effective or noneffective, and for allowing said SNR calculation means to calculate the SNR only when it is judged as effective.

18. The apparatus as claimed in claim 17, wherein said gaze point information judgment means includes means for judging whether said provided gaze point information is effective or noneffective, based upon a distance between a gaze point position in the current frame of the original video picture and a gaze point position in the previous frame, and upon a distance between the gaze point position in the previous frame and a corresponding position in the current frame which is derived by movement-compensating the gaze point in the previous frame.

19. The apparatus as claimed in claim 17, wherein said gaze point information judgment means includes means for judging that said provided gaze point information is effective only when a distance between a gaze point position in the current frame of the original video picture and a gaze point position in the previous frame is shorter than a threshold distance which defines pursuable limit in distance for observing a target between two frames, and a distance between the gaze point position in the previous frame and a corresponding position in the current frame which is derived by movement-compensating the gaze point in the previous frame is shorter than said threshold distance.

* * * * *